(12) United States Patent
Kim et al.

(10) Patent No.: US 10,448,775 B2
(45) Date of Patent: Oct. 22, 2019

(54) JUICE EXTRACTOR (71) Applicant: Hurom Co., Ltd., Gimhae-si, Gyeongsangnam-do (KR)

(72) Inventors: Jae-Won Kim, Gimhae-si (KR); Young-Ki Kim, Gimhae-si (KR)

(73) Assignee: Hurom Co., Ltd., Gimhae-si (KR)

( * ) Notice: Subject to any disclaimer, the term of this patent is extended or adjusted under 35 U.S.C. 154(b) by 645 days.

(21) Appl. No.: 14/896,401

(22) PCT Filed: Aug. 26, 2013

(86) PCT No.: PCT/KR2013/007623
§ 371 (c)(1),
(2) Date: Dec. 7, 2015

(87) PCT Pub. No.: WO2014/196691
PCT Pub. Date: Dec. 11, 2014

(65) Prior Publication Data
US 2016/0120353 A1 May 5, 2016

(30) Foreign Application Priority Data
Jun. 7, 2013 (KR) .................. 10-2013-0065407

(51) Int. Cl.
*A47J 19/02* (2006.01)
*A47J 43/07* (2006.01)

(52) U.S. Cl.
CPC ............. *A47J 19/02* (2013.01); *A47J 19/025* (2013.01); *A47J 43/07* (2013.01)

(58) Field of Classification Search
CPC .. A47J 19/02; A47J 19/06; A47J 43/07; A47J 43/046; A47J 19/027; A47J 19/025; A47J 43/042
(Continued)

(56) References Cited

U.S. PATENT DOCUMENTS

| 2,315,018 | A | * | 3/1943 | Lawrence | ............... A47J 19/02 222/189.06 |
| 2009/0049998 | A1 | * | 2/2009 | Kim | ....................... A47J 19/06 99/510 |

(Continued)

FOREIGN PATENT DOCUMENTS

| JP | 11-253302 | 9/1999 |
| KR | 20-1996-0009518 | 10/1996 |

(Continued)

OTHER PUBLICATIONS

International Search Report and the Written Opinion dated Mar. 17, 2014 From the Korean Intellectual Property Office Re. Application No. PCT/KR2013/007623 and Its Translation of Search Report in English.

*Primary Examiner* — Dana Ross
*Assistant Examiner* — Joseph W Iskra (57) ABSTRACT

The present invention relates to a juice extractor. The juice extractor includes: a main body; a housing; a cover; a mesh drum; and a feed screw, wherein a rotary cutting member is provided below the feed screw so that the rotary cutting member is rotated together with the rotation of the feed screw, whereby when the rotary cutting member is rotated, the lower end surface of the rotary cutting member grazes the upper end surface of the draff descending hole while intersecting the upper end surface of the draff descending hole so as to perform a cutting operation.

13 Claims, 8 Drawing Sheets

(58) Field of Classification Search
USPC .................................. 99/501, 502, 503, 513
See application file for complete search history.

(56) References Cited

U.S. PATENT DOCUMENTS

| | | | | |
|---|---|---|---|---|
| 2009/0293740 | A1* | 12/2009 | Sanchez De Leon Rodriguez Roda | A23N 1/003 99/496 |
| 2012/0055351 | A1* | 3/2012 | Wo | A47J 19/02 99/509 |
| 2012/0291638 | A1* | 11/2012 | Kim | A47J 19/027 99/501 |

FOREIGN PATENT DOCUMENTS

| | | |
|---|---|---|
| KR | 10-0793852 | 1/2008 |
| KR | 10-1101692 | 12/2011 |
| KR | 10-2012-0012040 | 2/2012 |
| KR | 10-2012-0016532 | 2/2012 |
| KR | 10-2012-0048224 | 5/2012 |
| KR | 10-1159177 | 6/2012 |
| KR | 10-1181103 | 9/2012 |
| WO | WO2013062166 * | 5/2013 |
| WO | WO 2014/196691 | 12/2014 |

\* cited by examiner

JUICE EXTRACTOR

RELATED APPLICATIONS

This application is a National Phase of PCT Patent Application No. PCT/KR2013/007623 having International filing date of Aug. 26, 2013, which claims the benefit of priority of Korean Patent Application No. 10-2013-0065407 filed on Jun. 7, 2013. The contents of the above applications are all incorporated by reference as if fully set forth herein in their entirety.

FIELD AND BACKGROUND OF THE INVENTION

The present invention relates to a juice extractor which can extract juice from fruits or vegetables to make fruit juice or vegetable juice.

Recently, as people's interest in health is on the rise, there is a high tendency that they will directly extract juice from the vegetables, fruits, grains or the like using a juice extractor and take the extracted juice at home. The development of household juicers to which this trend is reflected is in continuous progress.

As one example of juice extractors, Korean Patent Registration No. 793852 discloses a juice extractor which employs the principle of rubbing, pressing and crushing raw materials over a grater. Such a juice extractor makes soybean milk from soybeans and makes fruit juice from tender fruits having a high viscosity, such as tomatoes, kiwis or strawberries using a low-speed squeezing and grinding method. In addition, the juice extractor does not require a large space in using or keeping the juice extractor in custody as a housing thereof is vertically coupled to an upper side of a drive unit. Moreover, the raw materials put into the juice extractor are naturally moved downwardly. Thus, since the juice extraction speed is relatively high and the juice remaining phenomenon does not occur, juice can be promptly extracted from various kinds of vegetables or fruits.

Meanwhile, draff from which juice has been strained is discharged to the outside through a draff outlet port of a housing via a mesh drum discharge hole formed at a bottom surface of a mesh drum. In this case, when raw materials (e.g., salaries, pineapples or the like) having a relatively long, tough and fibrous texture are put into the juice extractor, a problem may occur in that the draff does not easily escape from the mesh drum discharge hole fluidically communicating with the draff outlet port but is hanging caught between the bottom of the mesh drum and the mesh drum discharge hole, and thus the draff remains in the mesh drum. Likewise, in the case where the draff is caught in the mesh drum discharge hole, it is difficult for the draff itself to escape from the mesh drum discharge hole in terms of a discharge structure. Consequently, the draff continues to be accumulated between the mesh drum bottom and the mesh drum discharge hole, and thus blocks off the mesh drum discharge hole. For this reason, the draff is not smoothly discharged through the mesh drum discharge hole, thereby deteriorating a juice extraction efficiency. In addition, a problem occurs in which raw materials which are put into the juice extractor and the draff which is not discharged are entangled with each other, so that they are accumulated upwardly inside the mesh drum, leading to an increase in loss of the raw materials and making the washing of the juice extractor troublesome and inconvenient.

SUMMARY OF THE INVENTION

Accordingly, an object of the present invention is to provide a juice extractor which can prevent draff from which has been strained from being accumulated inside the extractor as it is not discharged smoothly. In other words, it is an object of the present invention is to provide a juice extractor which can discharge the draff smoothly, thereby improving a juice extraction efficiency.

Technical Solution

To accomplish the above object, according to one embodiment of the present invention, there is provided a juice extractor including: a main body including a drive shaft configured to be rotated; a housing mounted on the main body and opened at a top thereof, the housing including a juice outlet port and a draff outlet port which are formed at a lower end portion thereof in such a manner as to be spaced apart from each other, and a draff descending hole formed on a bottom surface thereof so as to fluidically communicate with the draff outlet port; a cover mounted on the housing to cover the opened top of the housing; a mesh drum mounted inside the housing and opened at the top and bottom thereof, the mesh drum including a plurality of mesh holes formed on the sidewall thereof; and a feed screw connected with the drive shaft of the main body so as to be rotatably mounted on the main body and disposed inside the mesh drum, the feed screw including one or more screw spirals formed on an outer surface thereof, wherein a rotary cutting member is provided below the feed screw so that the rotary cutting member is rotated together with the rotation of the feed screw, whereby when the rotary cutting member is rotated, the lower end surface of the rotary cutting member grazes the upper end surface of the draff descending hole while intersecting the upper end surface of the draff descending hole so as to perform a cutting operation.

Preferably, a stationary blade is provided on the bottom surface of the housing so as to be positioned at the upper end of the draff descending hole confronting the rotary cutting member when the lower end surface of the rotary cutting member grazes the upper end surface of the draff descending hole while intersecting the upper end surface of the draff descending hole.

The stationary blade is preferably made of stainless steel or ceramic material which is rigid and rustproof.

In this embodiment, the feed screw includes one or more retaining slots formed on a lower circumferential bottom surface thereof, and the rotary cutting member includes: a rotary ring having a diameter larger than an inner diameter of a lower end portion of the mesh drum, one or more rotary blades horizontally extending radially toward the feed screw from the inner circumferential surface of the rotary ring by a predetermined length, and one or more retaining lugs vertically extending bent upwardly from one ends of the rotary blades by a predetermined length so that the retaining lugs are insertingly fixed to the retaining slots of the feed screw.

The rotary blade is formed in plural number on the inner circumferential surface of the rotary ring in such a manner that the rotary blades are spaced apart from one another at predetermined angle intervals.

Preferably, the each rotary blade is formed at a position corresponding to that of the draff descending hole so that when the rotary blade is rotated in a state of being close to the bottom surface of the housing, the lower end surface of the rotary blade grazes the upper end surface of the draff descending hole while intersecting the upper end surface of the draff descending hole. Preferably, when the rotary blade is rotated, a front end of the lower end surface of the rotary blade and an upper end of the inner circumferential surface of the draff descending hole sequentially forms an intersecting contact point so that the lower end surface of the rotary blade grazes the upper end surface of the draff descending hole.

The housing may include a draff discharge guide recess formed on the bottom surface thereof so as to guide draff to the draff descending hole as the feed screw is rotated, the draff discharge guide recess being formed in a circular arcuate shape.

Preferably, the rotary cutting member is rotated while pushingly moving the draff accumulated on the bottom surface of the housing.

Preferably, the housing includes a hollow through-part formed protrudingly upwardly at the center of the lower portion thereof and having a through-hole formed at the center of an upper portion thereof, and wherein a draff inflow space is formed inside the feed screw which accommodates the hollow through-part.

In another embodiment, the cover includes a plurality of retaining projections formed on the inner circumferential surface of a lower portion thereof in such a manner as to be spaced apart from one another at predetermined angle intervals, and the mesh drum includes a plurality of retaining parts formed on the outer circumferential surface of an upper portion thereof to have angle intervals corresponding to those of the retaining projections, so that when the retaining parts are fittingly engaged between the retaining projections and are turned in the engaged state, they are prevented from being moved by the retaining projections, thereby preventing the mesh drum from being displaced.

In still another embodiment, the housing includes a plurality of retaining recesses formed on the inner circumferential surface of an upper portion thereof in such a manner as to be spaced apart from one another at predetermined angle intervals, and the mesh drum has a plurality of retaining projection parts formed on the outer circumferential surface of an upper portion thereof to have angle intervals corresponding to those of the retaining recesses, so that when the retaining projection parts of the mesh drum is fittingly engaged with the retaining recesses of the housing, the retaining projections are prevented from being moved by the lower end of the cover engaged with the retaining recesses and the upper end of the housing, thereby preventing the mesh drum from being displaced.

The juice extractor in accordance with the present invention as constructed above have the following advantages. When draff is hanging caught in the draff descending hole during the discharge of the draff, it is cut off on the bottom surface of the mesh drum by the rotary cutting member rotated together with the feed screw, thereby eliminating a draff accumulation phenomenon and improving a juice extraction efficiency.

These effects of the invention are naturally exhibited by the construction of the invention irrespective of whether or not the inventor recognizes the effects. Therefore, the aforementioned effects should not be admitted as all the effects which are understood by the inventor or exist substantially. In addition, the effects of the present invention should be understood additionally by the entire disclosure of the specification. Although the effects of the present invention have not been described explicitly herein, they should be considered to be effects described herein as long as the present invention can be admitted as having such effects through this specification by a person having an ordinary skill in the art.

BRIEF DESCRIPTION OF THE SEVERAL VIEWS OF THE DRAWINGS

The above objects, other features and advantages of the present invention will become more apparent by describing the preferred embodiments thereof with reference to the accompanying drawings, in which.

* Explanation on reference numerals of main elements in the drawings *

| | |
|---|---|
| 100: cover | 110: inlet port |
| 120: rotary shaft hole | 130: engagement jaw |
| 140: retaining projections | 200: feed screw |
| 210: upper rotary shaft | 220: screw spirals |
| 225: discharge jaw | 230: drive shaft hole |
| 240: lower rotary shaft | 250: retaining slot |
| 260: draff inflow space | 300: mesh drum |
| 310: fixing grooves | 320: mesh holes |
| 330: retaining parts | 340: retaining projection parts |
| 400: rotary cutting member | 410: rotary ring |
| 420: rotary blades | 430: retaining lugs |
| 500: housing | 510: engagement projections |
| 520: bottom surface | 521: draff discharge guide recess |
| 522: fixing protrusion | 550: hollow through-part |
| 551: through-hole | 552: packing |
| 560: juice outlet port | 570: draff outlet port |
| 580: draff descending hole | 581: stationary blade |
| 590: retaining recess | 600: main body |
| 610: drive shaft | |

DESCRIPTION OF SPECIFIC EMBODIMENTS OF THE INVENTION

Hereinafter, preferred embodiments of the present invention will be described in detail with reference to the accompanying drawings.

Here, the terms or words used in the specification and the claims of the present invention should not be construed as being typical or dictionary meanings, but should be construed as meanings and concepts conforming to the technical spirit of the present invention on the basis of the principle that an inventor can properly define the concepts of the terms in order to described his or her invention in the best way. Therefore, embodiments described herein and configurations illustrated in the drawings are merely the most preferred embodiments of the present invention, and do not represent all of the technical spirits of the present invention. So, it should be understood that various equivalents or modifications which may replace the embodiments could exist at a time point of the application of the present invention.

In addition, the accompanying drawings may be partially shown in a slightly exaggerated manner to facilitate the understanding of the invention.

Figure 1:
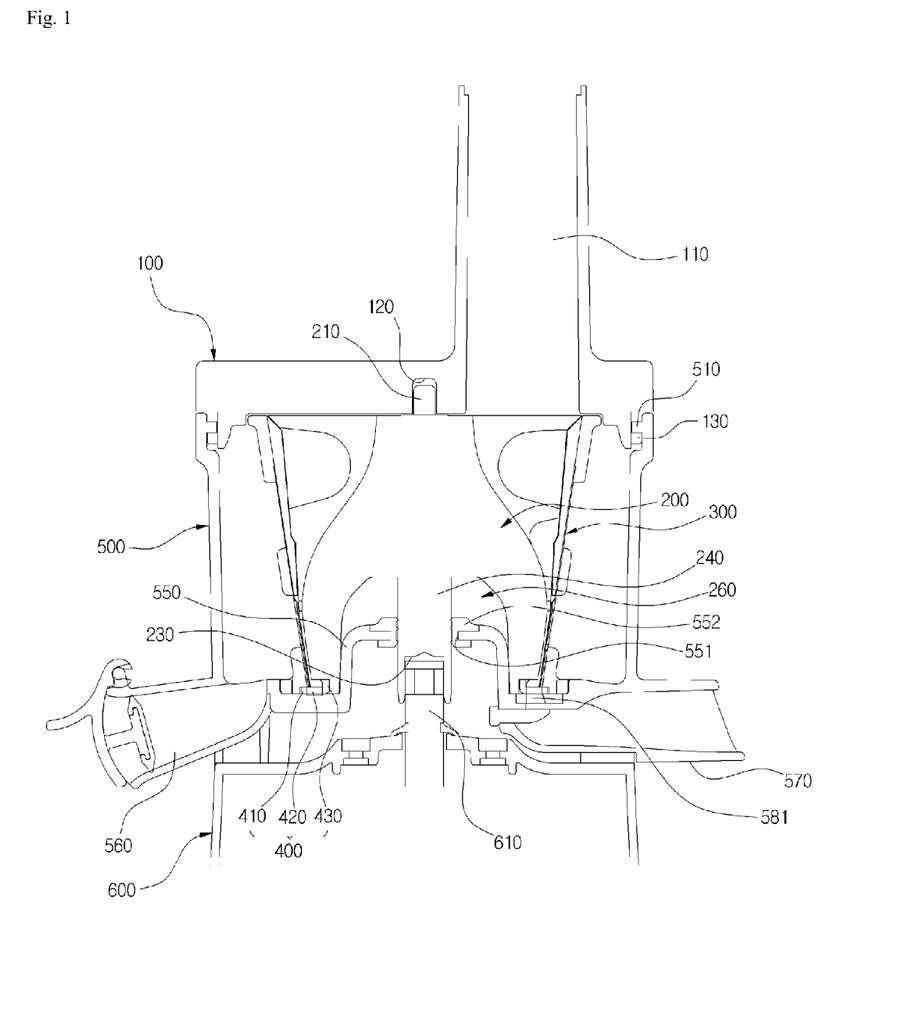
FIG. 1 is a schematic cross-sectional view showing a juice extractor in accordance with a first embodiment of the present invention.
Figure 2:
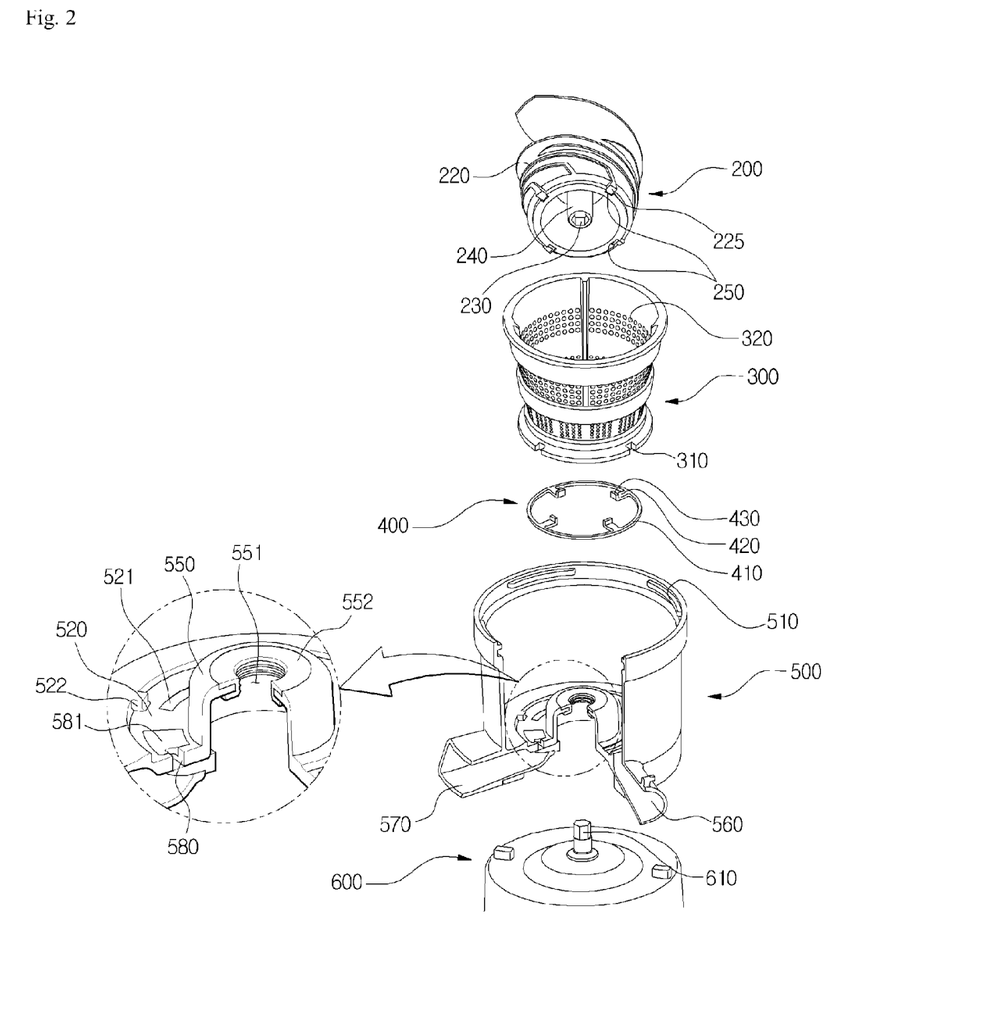
FIG. 2 is an exploded perspective view showing a juice extractor shown in FIG. 1.

As shown in FIGS. 1 and 2, a juice extractor in accordance with a first embodiment of the present invention includes a cover 100, a feed screw 200, a mesh drum 300, a rotary cutting member 400, a housing 500, and a main body 600.

The main body 600 is provided with a drive shaft 610 at an upper portion thereof so as to be protruded upwardly so that the drive shaft 610 can be engaged with a lower rotary shaft 240 of the screw 200. The drive shaft 610 is inserted into a drive shaft hole 230 of the screw 200. The drive shaft 610 is connected to a motor (not shown) and a speed reducer (not shown) so that it rotates at low speed and the feed screw 200 is rotated together with the rotation of the drive shaft 610. The drive shaft 610 is connected to a motor (not shown) and a speed reducer (not shown) so that it rotates the screw 200 at low speed while being rotated at low speed. But, the drive shaft and the feed screw may have any shape as long as they are directly or indirectly connected to each other to allow the drive shaft to transmit a driving force to the screw. The engagement structure between the drive shaft and the screw is always not limited to one in which the drive shaft protrudes upwardly from an upper portion of the main body so that it is connected with a lower portion of the feed screw. For example, although not shown, the drive shaft may be connected with an upper portion of the feed screw to transmit a driving force to the screw.

The housing 500 is mounted on the main body 600, and serves to accommodate the feed screw 200 and the mesh drum 300 therein. The housing 500 is opened at a top thereof and includes a juice outlet port 560 and a draff outlet port 570 which are formed at a lower end portion thereof in such a manner as to be spaced apart from each other. The draff outlet port 570 fluidically communicates with a draff descending hole 580 formed on a bottom surface 520 of the housing 500.

The housing 500 includes a hollow through-part 550 formed protrudingly upwardly at the center of the lower portion thereof. The hollow through-part 550 has a through-hole 551 formed at the center of an upper portion thereof so that the feed screw 200 can be connected with the drive shaft 610 of the main body 600 through the through-hole 551. Like this, since the hollow through-part 550 is protruded upwardly, juice can be prevented from being introduced into the through-hole 551 of the hollow through-part 550 from the bottom surface 520 of the housing 500. Further, a packing 552 made of a soft material such as rubber or silicone is mounted in the through-hole 551 of the hollow through-part 550 to exhibit a waterproof function, so that the juice can be more efficiently prevented from leaking to the outside of the housing 500 through the through-hole 551.

A draff discharge guide recess 521 is formed on the bottom surface 520 of the housing 500 so as to guide draff to the draff descending hole 580 as the feed screw 200 is rotated. The draff discharge guide recess 521 may be formed in a circular arcuate shape such that its distal end is connected with the draff descending hole 580. In addition, the draff discharge guide recess 521 may be formed such that it is gradually increased in depth and/or width as it goes toward the draff descending hole 580 so that the draff can be discharged smoothly.

A lower portion of the cover 100 is shaped to correspond to a shape of the top of the housing 500 to cover the opened top of the housing 500, and the cover 100 is opened at a bottom thereof. The cover 100 includes a cylindrical inlet port 110 formed protrudingly upwardly from a side of the top surface thereof so that a raw material can be put into the inlet port 110. The inlet port 110 fluidically communicates with the opened bottom of the cover 100.

A rotary shaft hole 120 is formed at the center of the underside of the cover 100. The rotary shaft hole 120 is preferably formed at the center of the cover 100, and the inlet port 110 is formed at a position deviated by a given distance from the center of the cover 100 so that the rotation of the feed screw 200 and the charge of the raw material into the inlet port 110 can be carried out smoothly.

A plurality of engagement jaws 130 is protrudingly formed on an outer peripheral edge of a lower end portion of the cover 100, and a plurality of engagement projections 510 is formed on an inner peripheral surface of an upper end portion of the housing 500 so that the engagement jaws 130 are engaged with the engagement projections 510 to cause the cover 100 to be detachably coupled to the housing 500.

The mesh drum 300 is formed in a cylindrical shape which is gradually reduced in diameter as it goes toward the bottom from the top. The mesh drum 300 is opened at the top and bottom thereof and is disposed inside the housing 500 in such a manner as to be seated at the outside of the draff discharge guide recess 521 formed on the bottom surface of the housing 500. In addition, a plurality of mesh holes 320 is formed on the sidewall of the mesh drum 300 so that after the raw material put into the mesh drum 300 through the inlet port 110 is compressed, squeezed, and crushed at low speed to produce juice as the feed screw is rotated, the produced juice passes through the mesh holes 320.

Further, the mesh drum 300 includes a plurality of fixing grooves 310 or fixing protrusions formed on the outer circumferential surface of the lower end portion thereof, and the housing 500 includes a plurality of fixing protrusions 522 or fixing grooves formed on the bottom surface thereof on which the mesh drum 300 is seated so as to correspond to the fixing grooves 310 or fixing protrusions of the mesh drum, so that the mesh drum 300 can be securely fixed to the housing 500. The aim for this is to prevent the mesh drum from being rotated together with the feed screw 200 when the feed screw 200 is rotated, thereby achieving a smooth juice extraction.

In the present invention, draff is not discharged to the outside through a mesh drum discharge hole formed at the lower end of the mesh drum unlike a conventional juice extractor (see Korean Patent Registration No. 0793852). More specifically, in the present invention, since the bottom surface of the mesh drum 300 is opened, the draff descending hole 580 and the draff discharge guide recess 521 come into close contact with the underside of the feed screw 200. Thus, in the conventional juice extractor, there is an inconvenience of having to assemble the juice extractor in such a manner that the mesh drum discharge hole correctly coincides with the draff descending hole of the housing in order to fluidically communicate the mesh drum discharge hole with the draff descending hole of the housing. On the contrary, in the juice extractor of the present invention, the mesh drum 300 and the housing 500 are more easily assembled with each other. In addition, in the conventional juice extractor, after the draff passes through the mesh drum discharge hole, it is discharged to the draff descending hole. Thus, if the draff contains a fibrous material in large amount, it is difficult for the draff to pass through the mesh drum discharge hole smoothly. On the other hand, the present invention enables draff to be directly discharged to the draff descending hole 580 through the opened bottom of the mesh drum 300 so that the discharge of the draff is smoothly carried out.

The upper rotary shaft 210, which is formed at the center of an upper end portion of the feed screw 200, is inserted into the rotary shaft hole 120 of the cover 100 so as to be rotated. A plurality of screw spirals 220, which are in close contact with the inner wall of the mesh drum 300, are formed on an outer surface of the feed screw 200. At the center of a lower portion of the screw 200, there is provided a lower rotary shaft 240 having a drive shaft hole 230 formed therein.

A plurality of discharge jaw 225 is formed on the outer peripheral surface of a lower end portion of the feed screw 200. The discharge jaw 225 serves to guide draff collected on the bottom surface 520 of the housing 500 to the draff descending hole 580 to cause the draff to be finally discharged to the draff descending hole 580.

In the meantime, the juice extractor of the present invention includes a rotary cutting member 400 so as to cut off the draff from which juice has been strained.

The rotary cutting member 400 is provided below the underside of the feed screw 200. Preferably, the rotary cutting member 400 may be made of stainless steel, ceramic material or the like, which is harmless to the human body, and is rigid and rustproof. The rotary cutting member 400 is coupled to the lower portion of the feed screw 200 so that it is rotated together with the rotation of the feed screw 200 and cuts off the draff while grazing the top surface of the draff descending hole 580.

The rotary cutting member 400 includes a rotary ring 410 having a diameter larger than an inner diameter of a lower end portion of the mesh drum, one or more rotary blades 420 horizontally extending radially toward the feed screw from the inner circumferential surface of the rotary ring by a predetermined length, and one or more retaining lugs 430 vertically extending bent upwardly from one ends of the rotary blades 420 by a predetermined length. A plurality of retaining slots 250 is formed on a lower circumferential end surface of the feed screw 200 in such a manner as to be spaced apart from one another at predetermined angle intervals, so that the retaining lugs 430 are insertingly fixed to the retaining slots 250 of the feed screw. Thus, a rotational force of the feed screw 200 can be transmitted to the rotary cutting member 400 so that the rotary cutting member 400 is rotated together with the rotation of the feed screw 200.

Herein, the retaining slots 250 of the feed screw 200 may selectively formed on an inner circumferential surface, an outer circumferential surface, or a circumferential bottom, of the lower end portion of screw 200. In this case, the retaining lugs 430 of the rotary cutting member 400 may be configured to be engaged with the retaining slots 250 of the feed screw 200 by properly modifying the length or shape of the rotary blades 420 and the retaining lugs 430.

In one embodiment of the present invention, four retaining slots 250 are formed on the lower circumferential end surface of the feed screw 200 in such a manner as to be spaced apart from one another at 90° intervals around the central axis of the screw 200, and four rotary blades 420 are formed on the inner circumferential surface of the rotary ring 410 to correspond to the four retaining slots 250 of the feed screw 200 in such a manner as to be spaced apart from one another at 90° intervals around the central axis of the rotary brush, so that the four rotary lugs 430 can be insertingly engaged with the four retaining slots 250.

Meanwhile, alternatively, a plurality of rotary blades may be formed extending outwardly radially from the underside of the feed screw.

Likewise, the rotary cutting member 400 provided on the feed screw 200 pushingly move the draff accumulated on the bottom surface 520 of the housing 500 while being rotated on the bottom surface of the mesh drum 300 together with the rotation of the feed screw 200. The rotary cutting member 400 grazes the upper end surface of the draff descending hole 580 to cause the draff caught in the draff descending hole 580 to be cut off so that the smooth discharge of the draff can be carried out.

Figure 3:
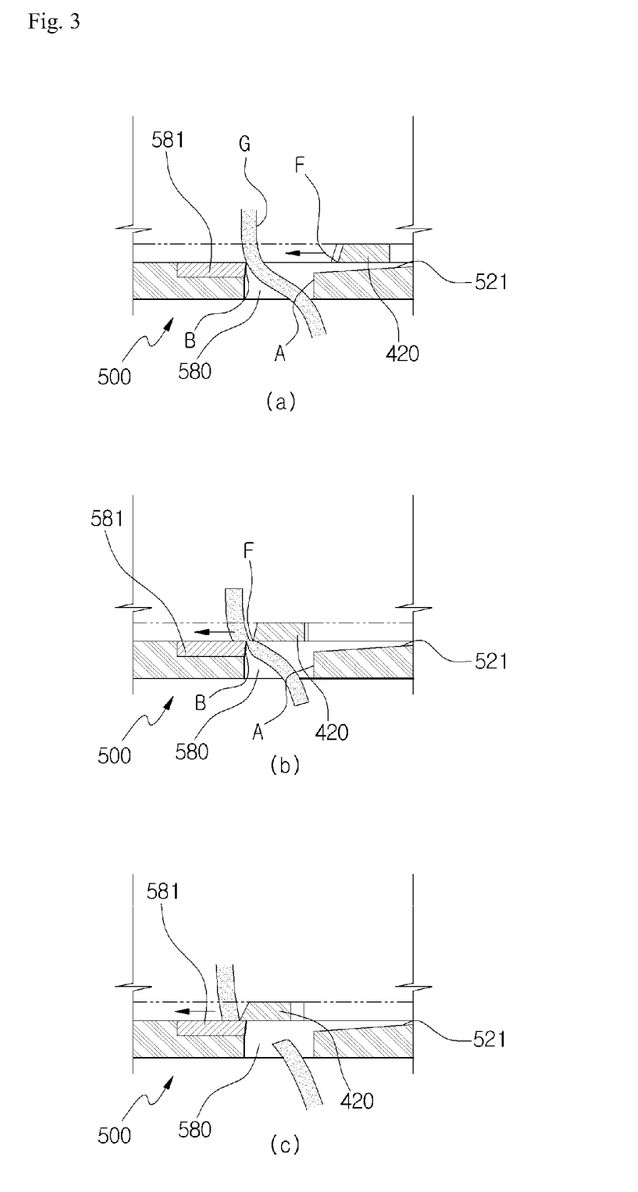
FIG. 3(a), 3(b) and 3(c) are cross-sectional views sequentially showing a process in which draff caught in a draff descending hole is cut off in a juice extractor in accordance with a first embodiment of the present invention.

When the rotary cutting member 400 is rotated, it cuts off the draff caught in the draff descending hole 580 but not escaping from the draff descending hole 580 while its lower end surface grazes the top surface of the draff descending hole 580. This cutting operation will be described hereinafter in detail with reference to FIGS. 3(*a*), 3(*b*) and 3(*c*). A gap is minimally formed between the lower end surfaces of the rotary blades 420 and the bottom surface of the housing 500.

The rotary blades 420 are moved along the draff discharge guide recess 521 as shown in FIG. 3(*a*). Thereafter, when the rotary blades 420 reach a position of the draff descending hole 580 as shown in FIG. 3(*b*), draff (G) hanging caught in the draff descending hole 580 without being discharged to the draff descending hole is cut off by the cutting action due to the intersection between the lower end surface of the rotary blades 420 and a part of the upper end surface of the draff descending hole 580 as shown in FIG. 3(*c*). Thus cut draff (G) is discharged to the outside through the draff outlet port 570 via the draff descending hole 580.

More specifically, on the upper end surface of the draff descending hole 580, there are positioned one end (A) which first meets a front end (F) of the lower end surface of the rotary blade 420 during the rotation of the rotary blade 420, and the other end (B) which later meets the front end (F) of the lower end surface of the rotary blade 420 after passing by the one end (A) during the further rotation of the rotary blade 420. In this case, the cutting of the draff is carried out when the front end (F) of the lower end surface of the rotary blade 420 intersects the other end (B) of the upper end surface of the draff descending hole 580.

In this case, the vertical cross-section of the rotary blade 420 has a trapezoidal shape. The front end (F) of the lower end surface of the rotary blade 420 may be formed to be slightly further protruded in the rotation progress direction of the arm 471, and the other end (B) of the draff descending hole 580, which corresponds to the front end (F) of the lower end surface of the rotary blade 420, also has a vertical cross-section of a trapezoidal shape and may be formed to be slightly further protruded at an upper tip thereof toward the rotary blade 420.

In addition, the front end (F) of the lower end surface of the rotary blade 420 and the other end (B) of the upper end surface of the draff descending hole 580 may intersect with each other in a parallel relation to each other.

Figure 4:
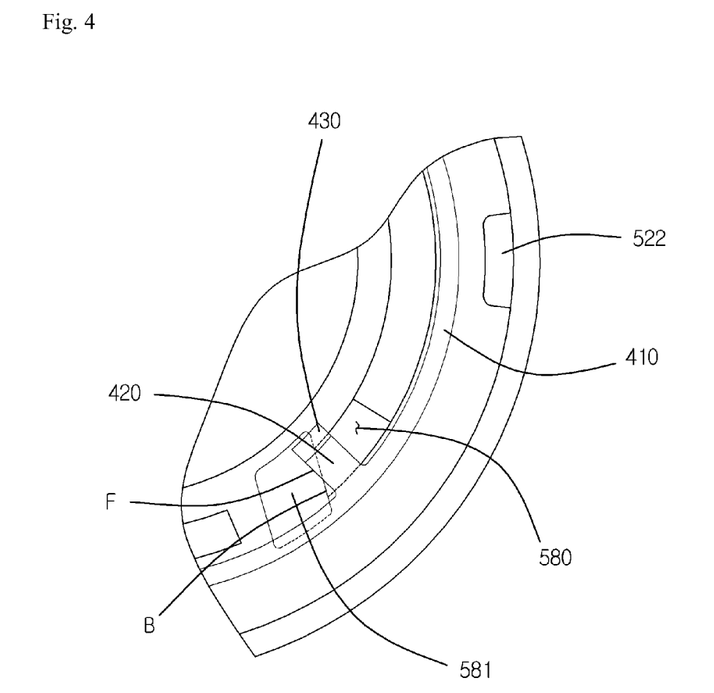
FIG. 4 is a top plan view showing a draff descending hole and a rotary cutting member of a juice extractor in accordance with a first embodiment of the present invention.

However, preferably, as shown in FIG. 4, when the rotary cutting member 400 is rotated, the front end (F) of the lower end surface of the rotary blade 420 and the other end (B) of the upper end surface of the draff descending hole 580 which is grazed by the lower end surface of the rotary blade 420 can intersect each other while sequentially forming an intersecting contact point, so that a cutting force is maximized at the intersecting contact point to further enhance a cutting effect. To this end, the draff descending hole 580 and/or the rotary blade 420 may have a horizontal cross-section of a trapezoidal or parallelogram shape. This cutting effect can be exhibited usefully particularly when juice is extracted from raw materials, for example, salaries, pineapples or the like having a relatively long, tough and fibrous texture.

In order to maximize the cutting effect, a stationary blade 581 may be mounted on the bottom surface 520 of the housing 500 so as to be in close contact with the upper end surface of the other end of the draff descending hole 580. When the lower end surface of the rotary blade 420 and the upper end surface of the stationary blade 581 intersect each other, the cutting of the draff can be more effectively performed.

Preferably, the stationary blade 581 may be made of stainless steel, ceramic material or the like, which is harmless to the human body, and is rigid and rustproof. In addition, the stationary blade 581 may be implemented as a detachable structure that can be disassembled from and assembled to the draff descending hole 580 so as to replace the stationary blade with new one at the time of abrasion thereof or facilitate the cleaning thereof.

In the meantime, in the juice extraction process according to the rotation of the feed screw 200, when draff is accumulated between the underside of the feed screw 200 and the bottom surface 520 of the housing 500, there may occur a phenomenon in which the feed screw 200 is lifted upwardly by an inflow pressure of the draff. For this reason, the feed screw 200 may apply a pressure to the inner surface of the cover 100 to make it difficult to open the cover 100 or a load may be applied to the juice extractor. Simultaneously, the rotary cutting member 400 provided at the lower portion of the feed screw 200 also becomes loose, and thus a gap between the rotary blade 420 and the draff descending hole 580 is widened, leading to a great reduction in the draff cutting effect.

Accordingly, the inventive juice extractor may be constructed such that the central inner surface of the feed screw 200, which accommodates the hollow through-part 550 of the housing 500, is spaced apart from the top surface of the hollow through-part 550 of the housing 500 so that the central inner surface of the feed screw 200 and the top surface of the hollow through-part 550 define an annular draff inflow space 260 therebetween.

By virtue of this construction, the draff accumulated on the underside of the feed screw 200 does not continue to be accumulated on the underside of the feed screw 200 and the bottom surface 520 of the housing 500, but is piled up along the sidewall of the hollow through-part 550 of the housing 500 so that the draff can be moved to and stored in the draff inflow space 260. Like this, the draff inflow space 260 performs a sort of buffer function (i.e., pressure absorbing function) so that a phenomenon can be prevented in which the feed screw 200 is lifted upwardly by the inflow pressure of the draff. Further, the inventive juice extractor is advantageous in terms of the manufacturing cost reduction due to a reduction in a material of which the feed screw 200 is made, the total weight of the feed screw is reduced, and no gap is formed between the lower end surface of the rotary blade 420 and the upper end surface of the draff descending hole 580 of the housing 500.

In the meantime, when a raw material is transferred to a lower portion of the mesh drum 300 along with the rotation of the feed screw 200, a pressure is generated, which affects the mesh drum 300 so that a phenomenon may occur in which the mesh drum 300 is likely to be moved to the lower portion of the mesh drum 300, at which time, the lower end of the mesh drum 300 presses the top surface of the rotary blade 420. Thus, the rotation of the rotary blade 420 is hindered, and there is a risk that the stationary blade 581 and the rotary blade 420 will be abraded and damaged.

Figure 5:
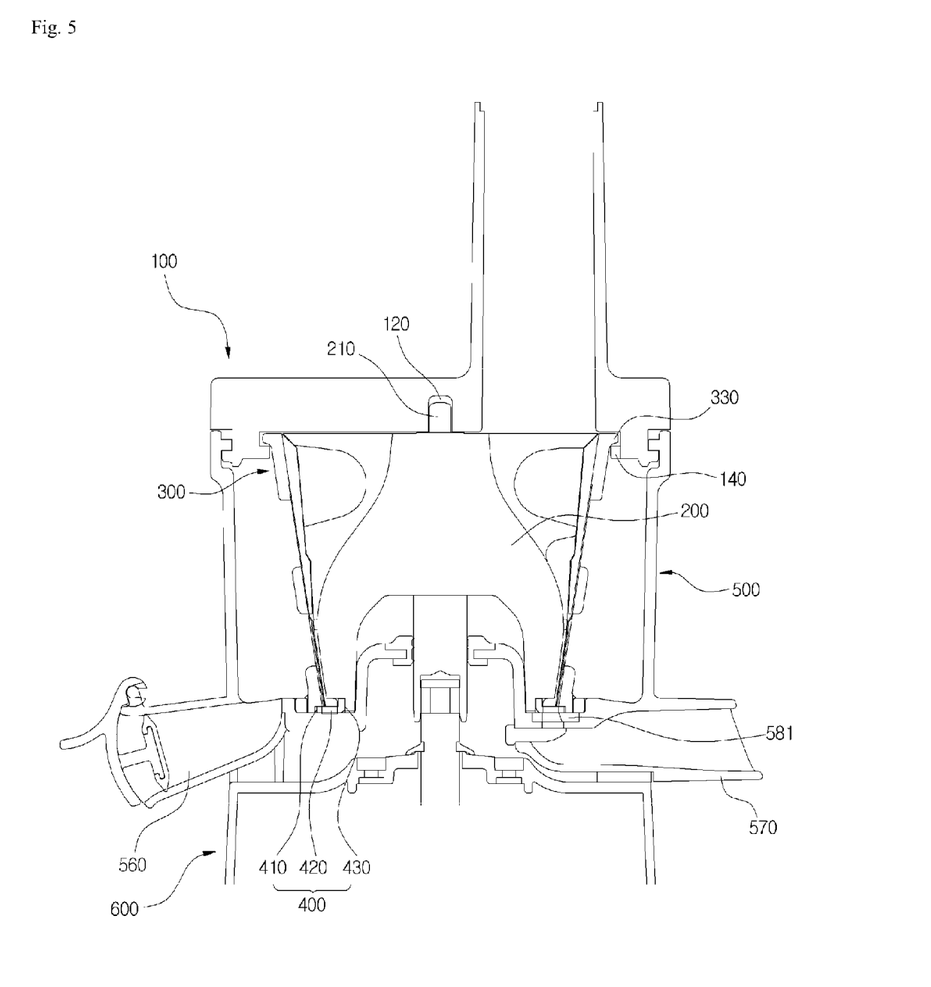
FIG. 5 is a schematic cross-sectional view showing a juice extractor in accordance with a second embodiment of the present invention.
Figure 6:
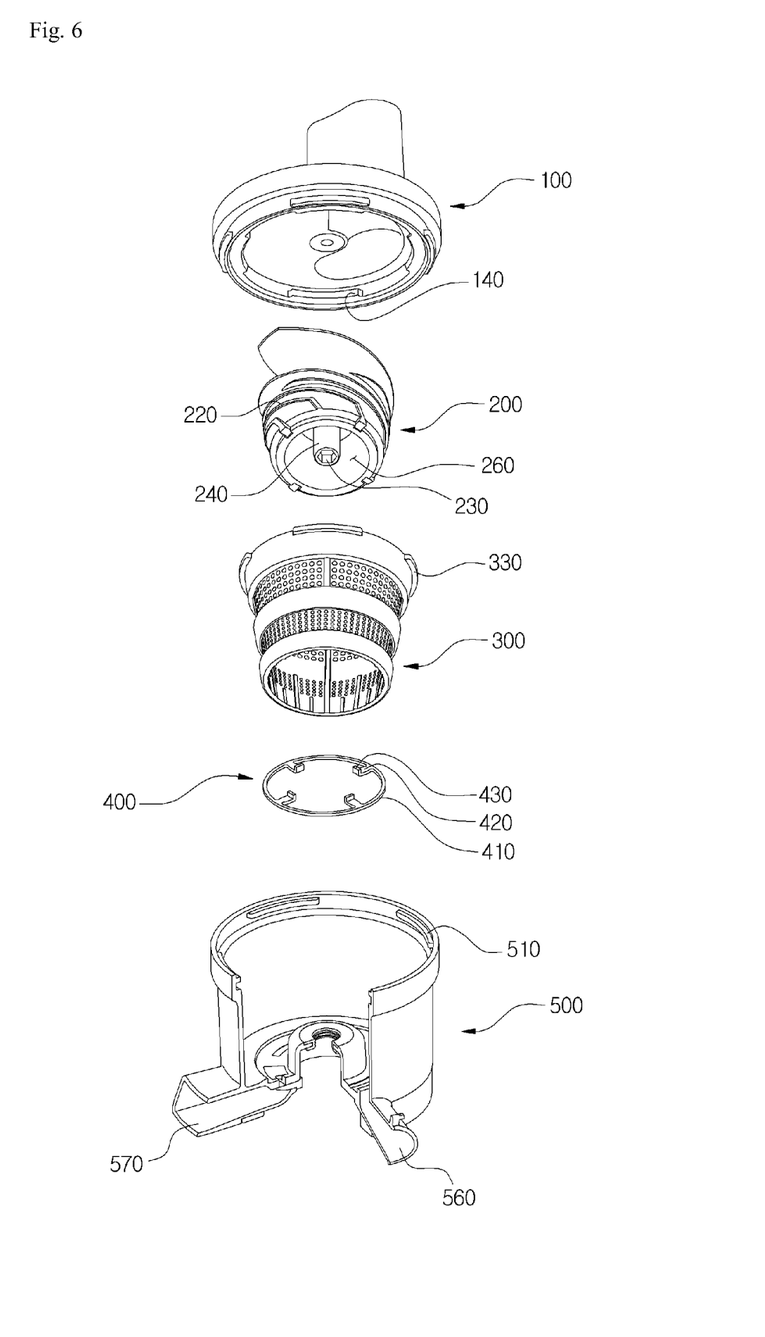
FIG. 6 is an exploded perspective view showing a juice shown in FIG. 5.

Thus, as shown in FIGS. 5 and 6, the juice extractor of the present invention may be constructed such that the cover 100 has a plurality of retaining projections 140 formed on the inner circumferential surface of a lower portion thereof in such a manner as to be spaced apart from one another at predetermined angle intervals, and the mesh drum 300 has a plurality of retaining parts 330 formed on the outer circumferential surface of an upper portion thereof to have angle intervals corresponding to those of the retaining projections 140. When the retaining parts 330 of the mesh drum 300 are fittingly engaged between the retaining projections 140 of the cover 100 and are turned in the engaged state, they are placed on the top surface of the retaining projections 140, thereby preventing a phenomenon in which the mesh drum 300 is pressed downwardly due to a feed pressure of the raw materials according to the rotation of the feed screw 200. For this reason, a distance between the lower end of the mesh drum 300 and the top surface of the rotary blade 420 can be maintained constantly, and thus the cutting action of the stationary blade 581 and the rotary blades 420 can be always correctly performed without being affected by the mesh drum 300.

Figure 7:
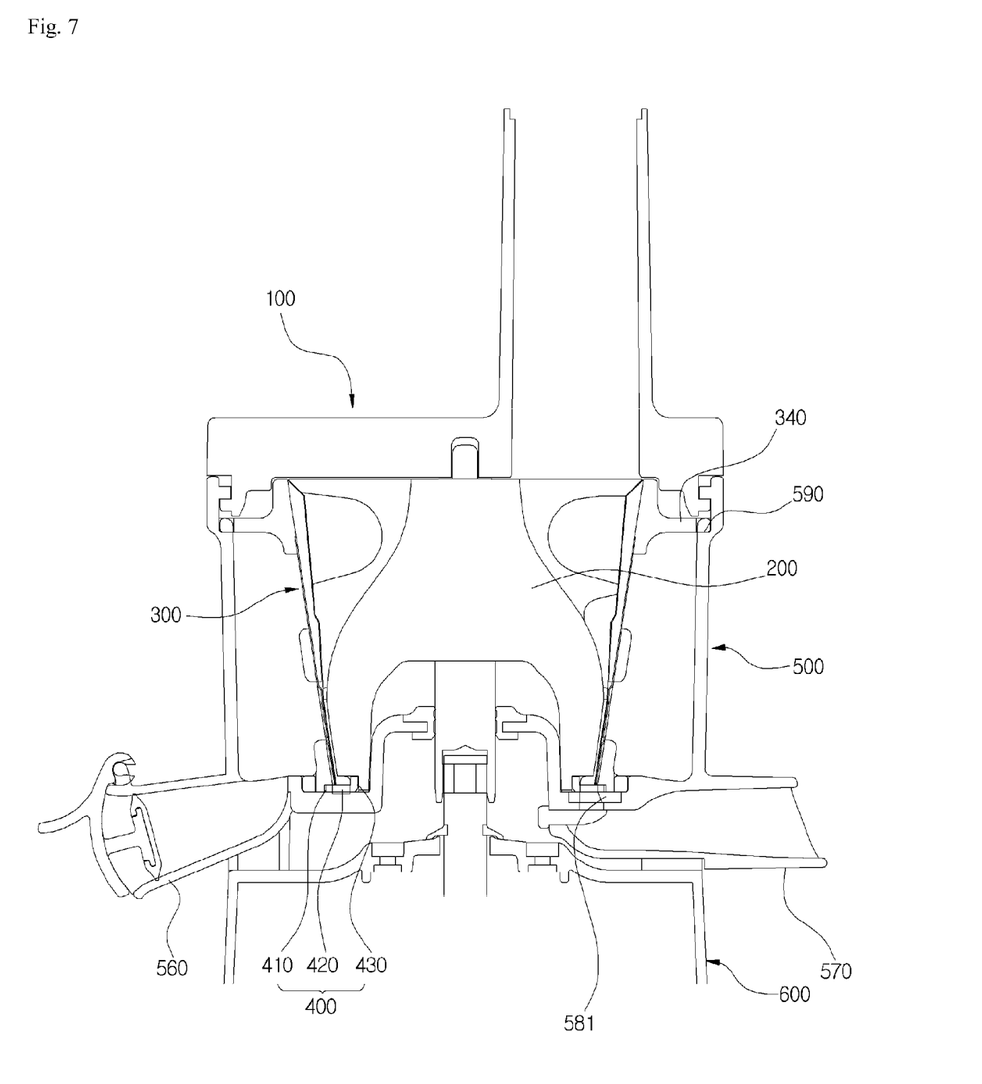
FIG. 7 is a schematic cross-sectional view showing a juice extractor in accordance with a third embodiment of the present invention.
Figure 8:
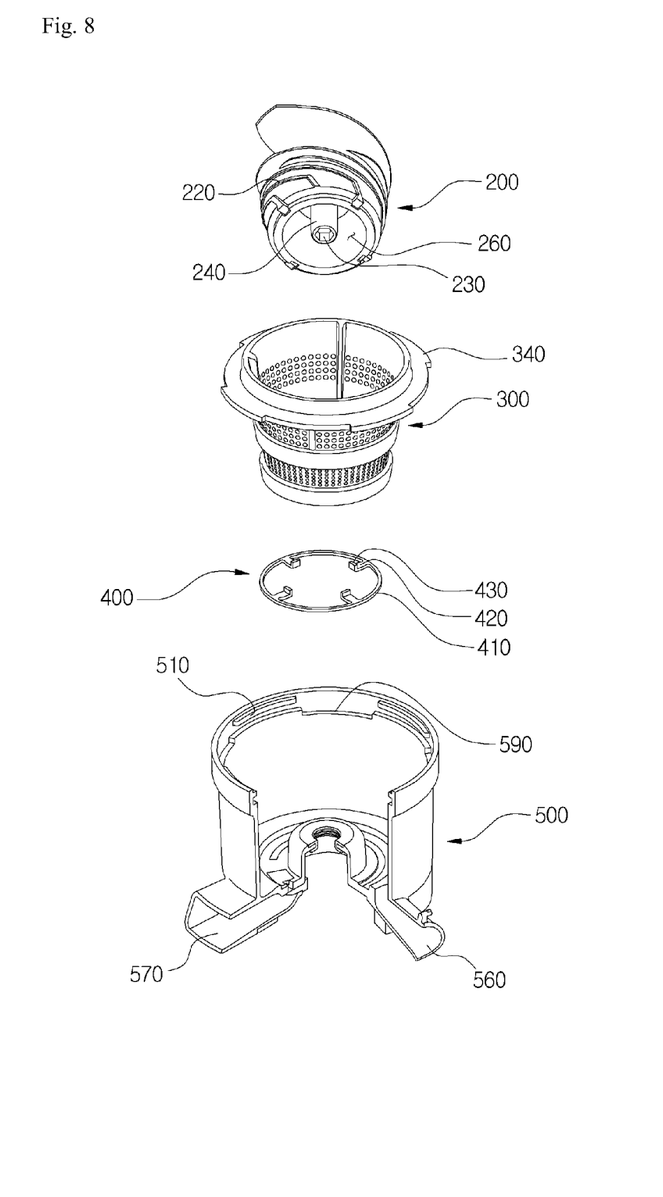
FIG. 8 is an exploded perspective view showing a juice shown in FIG. 7.

In addition, FIGS. 7 and 8 are views showing another embodiment according to the present invention in which the mesh drum 300 is prevented from being lowered. The housing 500 has a plurality of retaining recesses 590 formed on the inner circumferential surface of an upper portion thereof in such a manner as to be spaced apart from one another at predetermined angle intervals, and the mesh drum 300 has a plurality of retaining projection parts 340 formed on the outer circumferential surface of an upper portion thereof so as to have angle intervals corresponding to those of the retaining recesses 590, so that when the retaining projection parts 340 of the mesh drum 300 are fittingly engaged with the retaining recesses 590 of the housing 500 at the time of mounting the mesh drum 300 inside the housing 500, a phenomenon can be prevented in which the mesh drum is lowered depending on a change in pressure according to the rotation of the feed screw 200. For this reason, a gap between the lower end of the mesh drum 300 and the top surface of the rotary blades 420 can be maintained constantly, and thus the cutting action of the stationary blade 581 and the rotary blades 420 can be correctly performed without being affected by the mesh drum 300.

While the present invention has been described in connection with the specific embodiments illustrated in the drawings, they are merely illustrative, and the invention is not limited to these embodiments. It is to be understood that various equivalent modifications and variations of the embodiments can be made by a person having an ordinary skill in the art without departing from the spirit and scope of the present invention. Therefore, the true technical scope of the present invention should not be defined by the above-mentioned embodiments but should be defined by the appended claims and equivalents thereof.

What is claimed is:

1. A juice extractor comprising:
   a main body including a drive shaft configured to be rotated;
   a housing mounted on the main body and opened at a top thereof, the housing including a juice outlet port and a draff outlet port which are formed at a lower end portion thereof in such a manner as to be spaced apart from each other, and a draff descending hole formed on a bottom surface thereof so as to fluidically communicate with the draff outlet port;
a cover mounted on the housing to cover the opened top of the housing;
a mesh drum mounted inside the housing and opened at the top and bottom thereof, the mesh drum including a plurality of mesh holes formed on the sidewall thereof;
a feed screw connected with the drive shaft of the main body so as to be rotatably mounted on the main body and disposed inside the mesh drum, the feed screw including one or more screw spirals formed on an outer surface thereof; and
a rotary cutting member including one or more rotary blades, the rotary cutting member being detachably coupled to a lower portion of the feed screw the feed screw so that the rotary cutting member is rotated together with the rotation of the feed screw, whereby when the rotary cutting member is rotated, the lower end surface of the rotary cutting member grazes the upper end surface of the draff descending hole while intersecting the upper end surface of the draff descending hole so as to perform a cutting operation, wherein the rotary cutting member is arranged below a lower end of the mesh drum.

2. The juice extractor according to claim 1, wherein a stationary blade is provided on the bottom surface of the housing so as to be positioned at the upper end of the draff descending hole confronting the rotary cutting member when the lower end surface of the rotary cutting member grazes the upper end surface of the draff descending hole while intersecting the upper end surface of the draff descending hole.

3. The juice extractor according to claim 1, wherein the rotary cutting member comprises one or more rotary blades formed extending radially from the bottom surface of the feed screw.

4. The juice extractor according to claim 3, wherein the each rotary blade is formed at a position corresponding to that of the draff descending hole so that when the rotary blade is rotated in a state of being close to the bottom surface of the housing, the lower end surface of the rotary blade grazes the upper end surface of the draff descending hole while intersecting the upper end surface of the draff descending hole.

5. The juice extractor according to claim 1, wherein the feed screw comprises one or more retaining slots formed on a lower circumferential end surface thereof, and the rotary cutting member comprises: a rotary ring having a diameter larger than an inner diameter of a lower end portion of the mesh drum, one or more rotary blades horizontally extending radially toward the feed screw from the inner circumferential surface of the rotary ring by a predetermined length, and one or more retaining lugs vertically extending bent upwardly from one ends of the rotary blades by a predetermined length so that the retaining lugs are insertingly fixed to the retaining slots of the feed screw.

6. The juice extractor according to claim 5, wherein the rotary blade is formed in plural number on the inner circumferential surface of the rotary ring in such a manner that the rotary blades are spaced apart from one another at predetermined angle intervals.

7. The juice extractor according to claim 5, wherein the each rotary blade is formed at a position corresponding to that of the draff descending hole so that when the rotary blade is rotated in a state of being close to the bottom surface of the housing, the lower end surface of the rotary blade grazes the upper end surface of the draff descending hole while intersecting the upper end surface of the draff descending hole.

8. The juice extractor according to claim 5, wherein when the rotary blade is rotated, a front end of the lower end surface of the rotary blade and an upper end of the inner circumferential surface of the draff descending hole sequentially forms an intersecting contact point so that the lower end surface of the rotary blade grazes the upper end surface of the draff descending hole.

9. The juice extractor according to claim 1, wherein the housing includes a draff discharge guide recess formed on the bottom surface thereof so as to guide draff to the draft descending hole as the feed screw is rotated, the draff discharge guide recess being formed in a circular arcuate shape.

10. The juice extractor according to claim 9, wherein the rotary cutting member is rotated while pushingly moving the draff accumulated on the bottom surface of the housing.

11. The juice extractor according to claim 1, wherein the housing includes a hollow through-part formed protrudingly upwardly at the center of the lower portion thereof and having a through-hole formed at the center of an upper portion thereof, and wherein a draft inflow space is formed inside the feed screw which accommodates the hollow through-part.

12. The juice extractor according to claim 1, wherein the cover includes a plurality of retaining projections formed on the inner circumferential surface of a lower portion thereof in such a manner as to be spaced apart from one another at predetermined angle intervals, and the mesh drum includes a plurality of retaining parts formed on the outer circumferential surface of an upper portion thereof to have angle intervals corresponding to those of the retaining projections, so that when the retaining parts are fittingly engaged between the retaining projections and are turned in the engaged state, they are prevented from being moved by the retaining projections, thereby preventing the mesh drum from being displaced.

13. The juice extractor according to claim 1, wherein the housing includes a plurality of retaining recesses formed on the inner circumferential surface of an upper portion thereof in such a manner as to be spaced apart from one another at predetermined angle intervals, and the mesh drum has a plurality of retaining projection parts formed on the outer circumferential surface of an upper portion thereof to have angle intervals corresponding to those of the retaining recesses, so that when the retaining projection parts of the mesh drum is fittingly engaged with the retaining recesses of the housing, the retaining projection parts are prevented from being moved by the lower end of the cover engaged with the retaining recesses and the upper end of the housing, thereby preventing the mesh drum from being displaced.

* * * * *